(12) United States Patent
Estess et al.

(10) Patent No.: US 9,138,015 B2
(45) Date of Patent: Sep. 22, 2015

(54) NUT SHELL REMOVAL SYSTEM AND METHOD

(71) Applicants: Gary Estess, Von Ormy, TX (US); Russell Walker, San Antonio, TX (US)

(72) Inventors: Gary Estess, Von Ormy, TX (US); Russell Walker, San Antonio, TX (US)

( * ) Notice: Subject to any disclaimer, the term of this patent is extended or adjusted under 35 U.S.C. 154(b) by 123 days.

(21) Appl. No.: 13/756,504

(22) Filed: Jan. 31, 2013

(65) Prior Publication Data

US 2013/0298785 A1    Nov. 14, 2013

Related U.S. Application Data

(60) Provisional application No. 61/593,017, filed on Jan. 31, 2012.

(51) Int. Cl.
*A47J 43/26* (2006.01)
*A23N 5/00* (2006.01)

(52) U.S. Cl.
CPC *A23N 5/008* (2013.01); *A47J 43/26* (2013.01)

(58) Field of Classification Search
CPC .......................................................... A47J 43/26
USPC ............. 99/575, 571, 568, 580; 426/481, 482
See application file for complete search history.

(56) References Cited

U.S. PATENT DOCUMENTS

| | | | | |
|---|---|---|---|---|
| 899,433 A * | 9/1908 | Raby | | 99/574 |
| 994,591 A * | 6/1911 | Jacobs | | 99/575 |
| 1,420,263 A * | 6/1922 | Isaachsen | | 99/575 |
| 2,135,420 A * | 11/1938 | Wylie | | 99/579 |
| 2,339,596 A * | 1/1944 | Wright | | 99/579 |
| 2,381,288 A * | 8/1945 | Jones | | 99/571 |
| 3,127,016 A * | 3/1964 | Baigent | | 209/590 |
| 3,401,730 A * | 9/1968 | Mathews et al. | | 99/574 |
| 3,540,504 A * | 11/1970 | Hall et al. | | 99/577 |
| 4,212,398 A * | 7/1980 | Parker et al. | | 209/590 |
| 4,218,968 A * | 8/1980 | Livingston | | 99/572 |
| 4,515,076 A * | 5/1985 | Reznik | | 99/571 |
| 4,614,033 A * | 9/1986 | Morris | | 30/120.2 |
| 4,690,048 A * | 9/1987 | Namdari | | 99/575 |
| 4,819,331 A * | 4/1989 | Joyama | | 30/120.2 |
| 5,415,085 A * | 5/1995 | Thomson | | 99/574 |
| 5,461,970 A * | 10/1995 | Edwards, Jr. | | 99/575 |
| 5,721,002 A * | 2/1998 | Whaling | | 426/482 |
| 5,931,087 A * | 8/1999 | Spencer | | 99/575 |
| 6,098,530 A * | 8/2000 | Hemry | | 99/575 |
| 6,209,448 B1 * | 4/2001 | Hagen | | 99/575 |
| 6,397,737 B1 * | 6/2002 | Eisel | | 99/571 |
| 7,717,033 B1 * | 5/2010 | Kim | | 99/574 |
| 8,273,396 B1 * | 9/2012 | Shepard et al. | | 426/478 |
| 2005/0072871 A1 * | 4/2005 | Green | | 241/242 |
| 2006/0185532 A1 * | 8/2006 | Andreasen | | 99/568 |

* cited by examiner

*Primary Examiner* — Dana Ross
*Assistant Examiner* — John J Norton
(74) *Attorney, Agent, or Firm* — Kammer Browning PLLC (57) ABSTRACT

A device and method for shelling nuts. The device may be attached to a belt sander. The device includes a hopper into which the nuts are initially placed. Two large threaded fasteners on the central portion are used to adjust the system for the size of nut being shelled. A bracket placed behind the central portion attaches the device to the sander. The rotating belt brings the nut down to a lower opening formed to be just smaller than the shell of the nut being shelled. As the shell of the nut is caused to pass through this opening, the shell cracks. The nut with the cracked shell now impacts on one or more strike plates. These impacts further propagate the cracks formed in the shell so that the fragmented shells fall away from the nut. The nut and the cracked shells fall into the collection bag.

18 Claims, 6 Drawing Sheets

NUT SHELL REMOVAL SYSTEM AND METHOD

CROSS REFERENCES TO RELATED APPLICATIONS

This application claims the benefit under Title 35 United States Code §119(e) of U.S. Provisional Application 61/593,017 filed Jan. 31, 2012, the full disclosure of which is incorporated herein by reference.

BACKGROUND OF THE INVENTION

1. Field of the Invention

The present invention pertains to a small, easy-to-use system and method for removing shells from nuts.

2. Description of the Related Art

The individual removal of the shells from edible nuts is known to most people who have ever used a nut cracker. On a larger scale, a variety of various types of machines have been made to remove the shells from edible nuts. Those businesses that specialize in the sale of edible nuts often begin by purchasing one or more expensive nut shelling machines.

For the small grower, typically a farmer or rancher owning a few nut-bearing trees, the number of nuts to be shelled rarely justifies the expense of a nut shelling machine. Without a nut shelling machine, the only alternative for the farmer or rancher is a manual nut cracker. Therefore, a need remains in the art for a low cost, easy-to-use nut shelling system and method.

SUMMARY OF THE INVENTION

The nut shelling system and method of the present invention provides a low cost, easy-to-use system and method for shelling nuts. A better understanding of the system and method of the present invention is best understood by reference to the attached photographs and drawing figures. The invention may be attached to an ordinary work bench mounted sander. The rotating sanding disc on the side of the work bench mounted sander is not used. Only the rotating belt portion of the work bench mounted sander is used. The invention includes a hopper at the top into which the nut meats and the shell fragments fall. The two large threaded fasteners on the central portion are used to adjust the system and method of the present invention for the size of nut being shelled. A bracket placed behind the central portion attaches the nut sheller of the present invention to the sander. The rotating belt brings the nut down to a lower opening formed to be just smaller than the shell of the nut being shelled. As the shell of the nut is caused to pass through this opening by the frictional engagement with the rotating belt, the shell cracks. At the top of the hopper, one or more bars may be mounted. These bars both provide safety and can be used to regulate the size of the nut put into the sheller of the present invention. As the nuts enter the hopper at the top and fall through the central portion of the housing, the exterior of the nut eventually comes into contact with the moving belt. The friction of the moving belt against the outside surface of the shell pulls the nut through the opening at the bottom of the central portion which is formed to be just smaller than the nut. Movement of the nut through the opening cracks the shell. The nut with the cracked shell now impacts the strike plate. This impact of the outside of the shell with the strike plate further propagates the crack formed in the shell so that many of the fragmented shells will fall away from the nut. The nut and the cracked shells fall into the collection bag for separation at a later time.

DETAILED DESCRIPTION OF THE PREFERRED EMBODIMENTS

The nut shell removal system and method is enabled by an apparatus having three key components. The first component is a power driven belt such as a belt sander. While a bench mounted belt sander is shown in the preferred embodiment described below, those of ordinary skill in the art will understand that a portable belt sander may be used provided the necessary bracketry is fashioned to hold the portable belt sander in place.

The second component is the angled plate along which the nuts to be shelled slide before making contact with the moving belt portion of the belt sander. As previously indicated, the position of the bottom of the angled plate is adjusted so that its distance from the moving belt is slightly smaller than the dimension of the shell to be cracked. The adjustment may be made in many ways, however, a bolt and locking nut is used in the preferred embodiment.

Those of ordinary skill in the art will understand that for those nuts which require application of force on the shell in a particular direction, the nut may have to be specially oriented with respect to the moving belt. For example, in the cracking of the shells of almonds, the angled plate may include channels which cause the almonds to be positioned so that the edge of each almond is in contact with the moving belt.

The third component is the housing which holds the angled plate in the proper position with respect to the moving belt and provides a mounting to the sander. As previously indicated, the housing includes a hopper at the top constructed and arranged to receive the shelled nuts. The central portion provides the passage through which the nuts fall on their way to contact with the moving belt. On the bottom of the central portion of the housing is the exit chute which contains the striking plate to further crack the shell and separate the shell from the nut. The exit chute includes a bottom portion onto which the catch bag may be attached.

Those of ordinary skill in the art will understand that the disclosed system and method may be used with various different types of nuts to include Brazil nuts, pecans, walnuts, peanuts, almonds, etc. Modification of the disclosed invention includes using a heavy-duty belt with a rubber coating or having a rough surface instead of the sanding belt. A hard rubber or hard rubber coating may be used with the angled plate.

While a sander having an electric motor is shown, those of ordinary skill in the art will realize that a portable device driven by a hand crank attached to a special increasing gear set-up may be used if nut shelling is to be done away from a source of electricity.

Reference is made below to a detailed description of a preferred embodiment of the system of the invention. It will be recognized by those skilled in the art that some variations on the size and configuration of the basic components of the invention may be made. The preferred embodiment shown and described is configured to fit onto a standard sized bench mounted belt sander of the type with a belt platform that may be varied in its angle to the base. The brackets of the present invention may be mounted to such a belt sander with relatively minor modifications to sander itself. As shown, four bolt or screw holes may be drilled and tapped into the sides of the belt platform where attached bolts will fit into the hook portions of the bracket. As the device of the present invention is easily removed from the belt sander, it may be returned to ordinary use when not being used to shell nuts.

Figure 1:
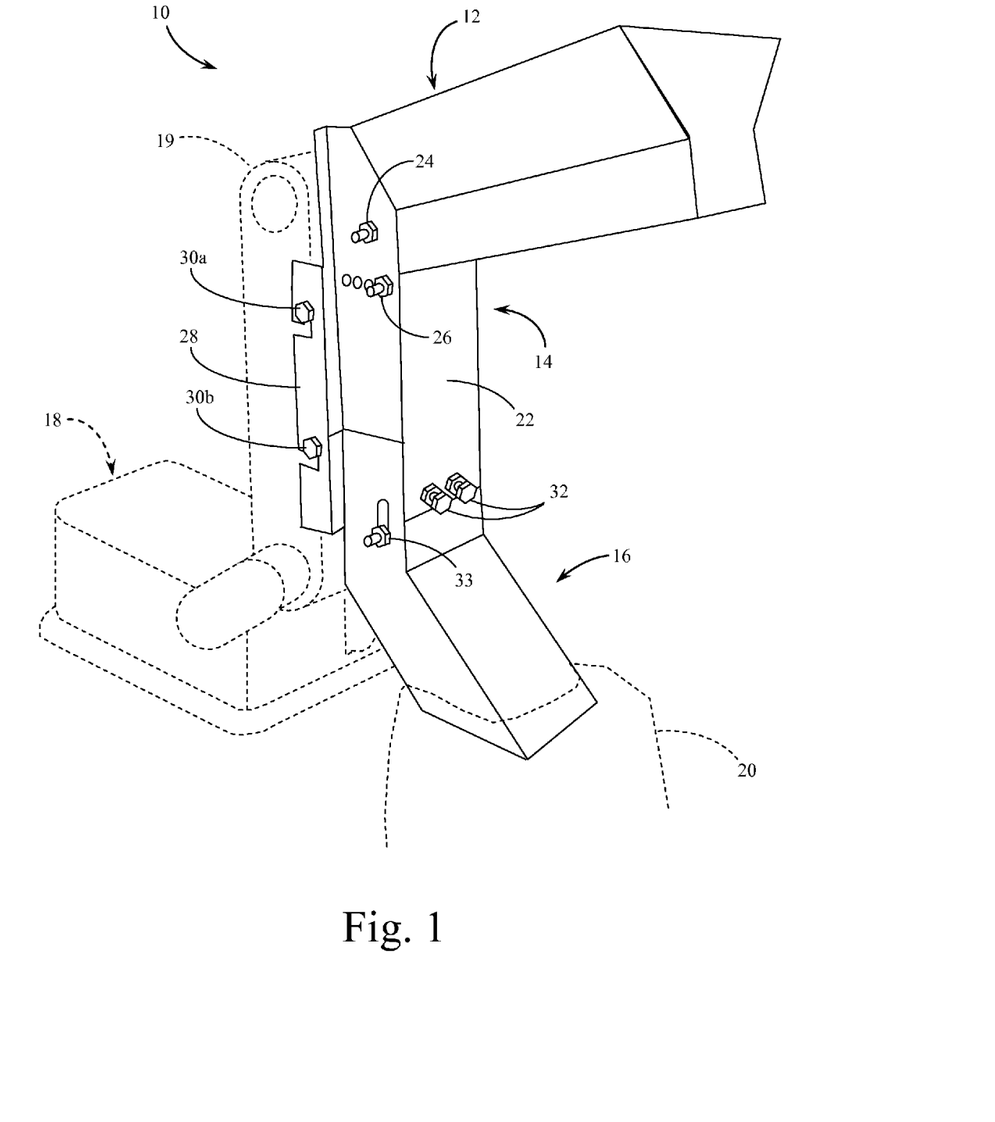
FIG. 1 is a perspective view of the preferred embodiment of the present invention shown attached to a standard bench type belt sander.

FIG. 1 is a perspective view of nut sheller 10 of the present invention shown to primarily comprise hopper 12, main housing 14, and exit chute 16. Nut sheller 10 is attached to belt sander 18 shown in dashed outline form. Collection bag 20 (also shown in dashed outline form) is attached to exit chute 16.

Main housing 14 defines primary chute 22 that is mounted on and runs parallel to moving belt 19 of belt sander 18. Hopper 12 is attached to primary chute 22 by way of hopper attachment bolts 24. Extending through primary chute 22 and described in more detail below, is angled plate support rod 26. Primary chute 22 is connected to belt sander 18 so as to run parallel to and cover moving belt 19 by way of mounting bracket 28. Mounting bracket 28 is attached to belt sander 18 by way of bracket bolts 30a & 30b. The internal components associated with primary chute 22 are described in more detail below. Externally, adjustment bolts 32 are seen to extend through the wall of primary chute 22 where they may be easily adjusted so as to alter the angle of the internal angled plate. Exit chute attachment bolts 33 connect primary chute 22 with exit chute 16.

As described above, nuts may be placed within hopper 12 where they fall by means of gravity into primary chute 22 which, running parallel with moving belt 19, established a choke point at which the nut shells may be cracked. Subsequent motion of the nut shells through a series of strike plates within primary chute 22 and exit chute 16 separate the meat from the shell and dispense both into collection bag 20 through exit chute 16.

Figure 2:
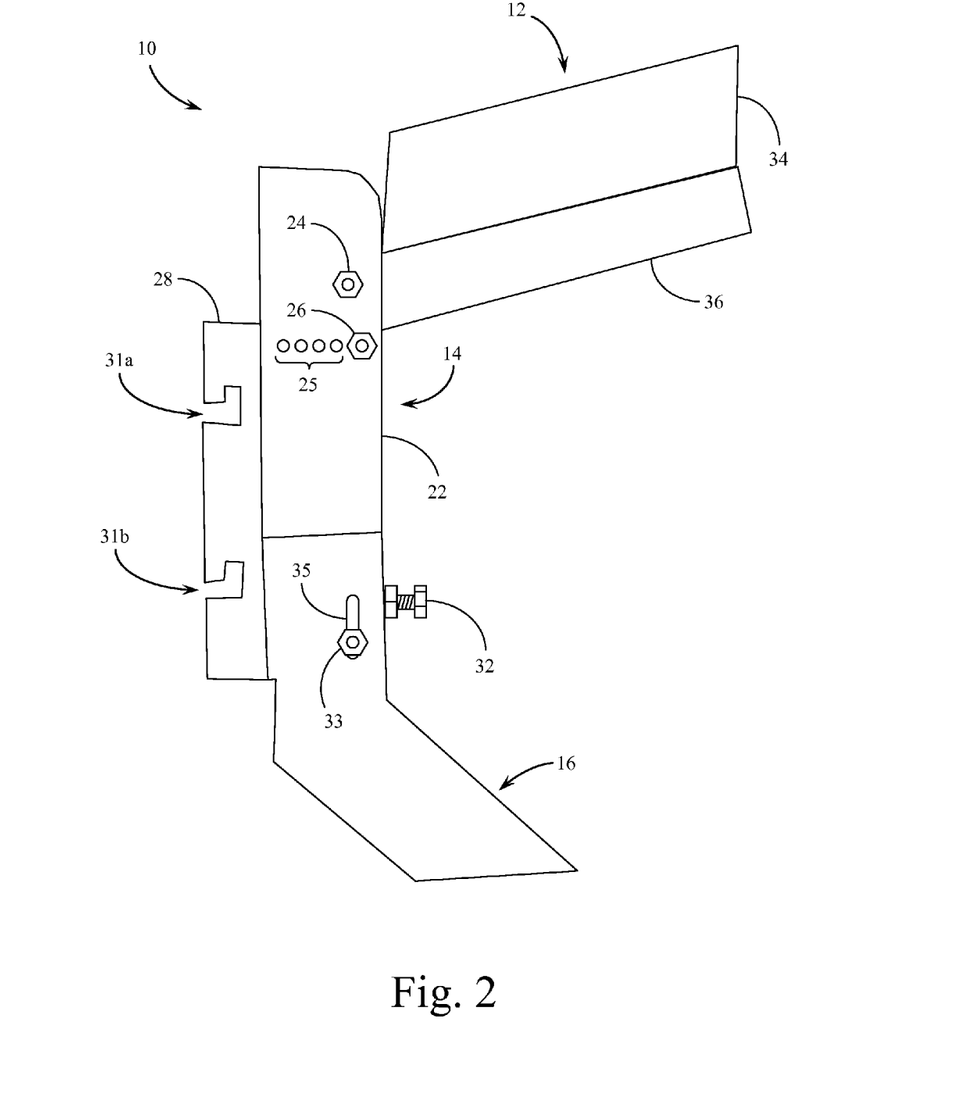
FIG. 2 is a side plan view of the preferred embodiment of the present invention shown removed from the belt sander.

Reference is next made to FIG. 2 which is a side elevational view showing nut sheller 10 again comprised primarily of hopper 12, main housing 14, and exit chute 16. Nut sheller 10 in this view is shown removed from the external belt sander for clarity.

Hopper 12 is shown to comprise hopper sides 34 and hopper base 36 which are oriented and sized to allow a quantity of nuts to be placed within the device and gradually fed into primary chute 22. Again, hopper 12 is attached to main housing 14 and primary chute 22 by way of hopper attachment bolts 24. Angled plate support rod 26 terminates on the external walls of primary chute 22 and extends therethrough in a manner that does not obstruct movement of nuts through the device. Top angle adjustment holes 25 are positioned in the walls of primary chute 22 of main housing 14 so as to allow for greater adjustment of the internal angled plate (described in more detail below). Mounting bracket 28 comprises part of main housing 14 and is positioned parallel with primary chute 22 so as to secure an open face of primary chute 22 parallel with and against the moving belt of the belt sander (not shown). Once again, the device is secured to the belt sander by way of mounting bracket 28 utilizing bracket hooks 31a & 31b.

Exit chute 16 is attached to primary chute 22 by way of exit chute attachment bolt 33. This attachment bolt may also extend across the width of the device to the opposite side since, in this position, it does not obstruct the path of the nuts. Exit chute adjustment channel 35 allows for variations in the distance between the choke point of the device (described in more detail below) and the strike plates associated with exit chute 16. Choke point adjustment bolts 32 operate to move internal components so as to vary the angle of the internal angled plate and thereby vary the size of the choke point opening.

Figure 3:
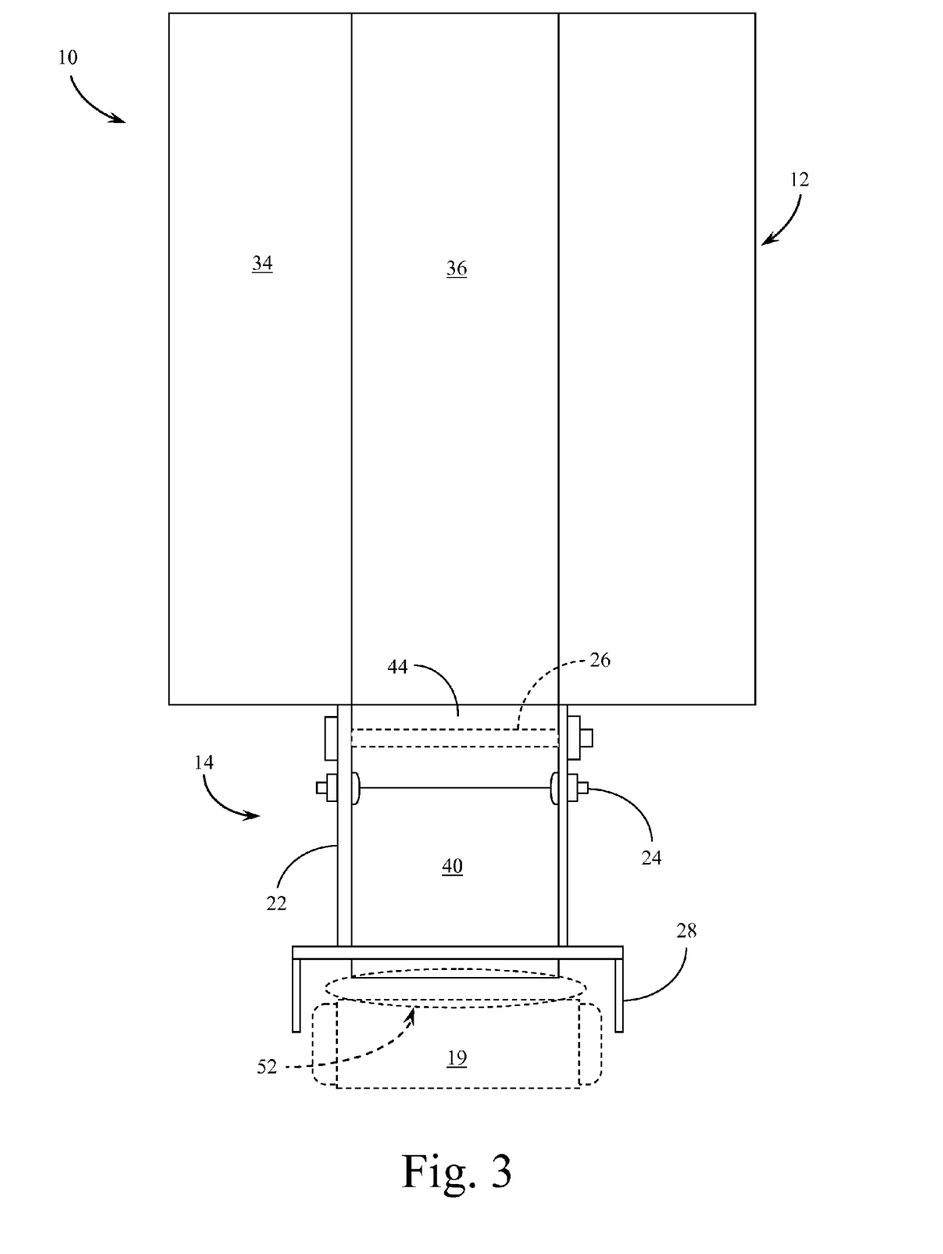
FIG. 3 is a top plan view of the preferred embodiment of the present invention showing the opening into which the nuts to be shelled are placed.

FIG. 3 is a top plan view of the device of the present invention showing the top of nut sheller 10 with hopper 12 comprising hopper sides 34 and hopper base 36. Hopper feed shelf 44 extends into and over the top of main housing 14 and serves to deliver the unshelled nuts into primary chute 22. Hopper attachment bolts 24 simply secure hopper 12 to main housing 14 and do not extend across the width of primary chute 22. In contrast, angled plate support rod 26 extends across the width of primary chute 22 in a manner that supports angled plate 40 at its top edge (see description below).

Mounting bracket 28 is shown to extend from an open face of primary chute 22 in a manner that allows it to attach to the belt sander and partially cover moving belt 19 so as to form choke point 52 between moving belt 19 and angled plate 40.

Figure 4:
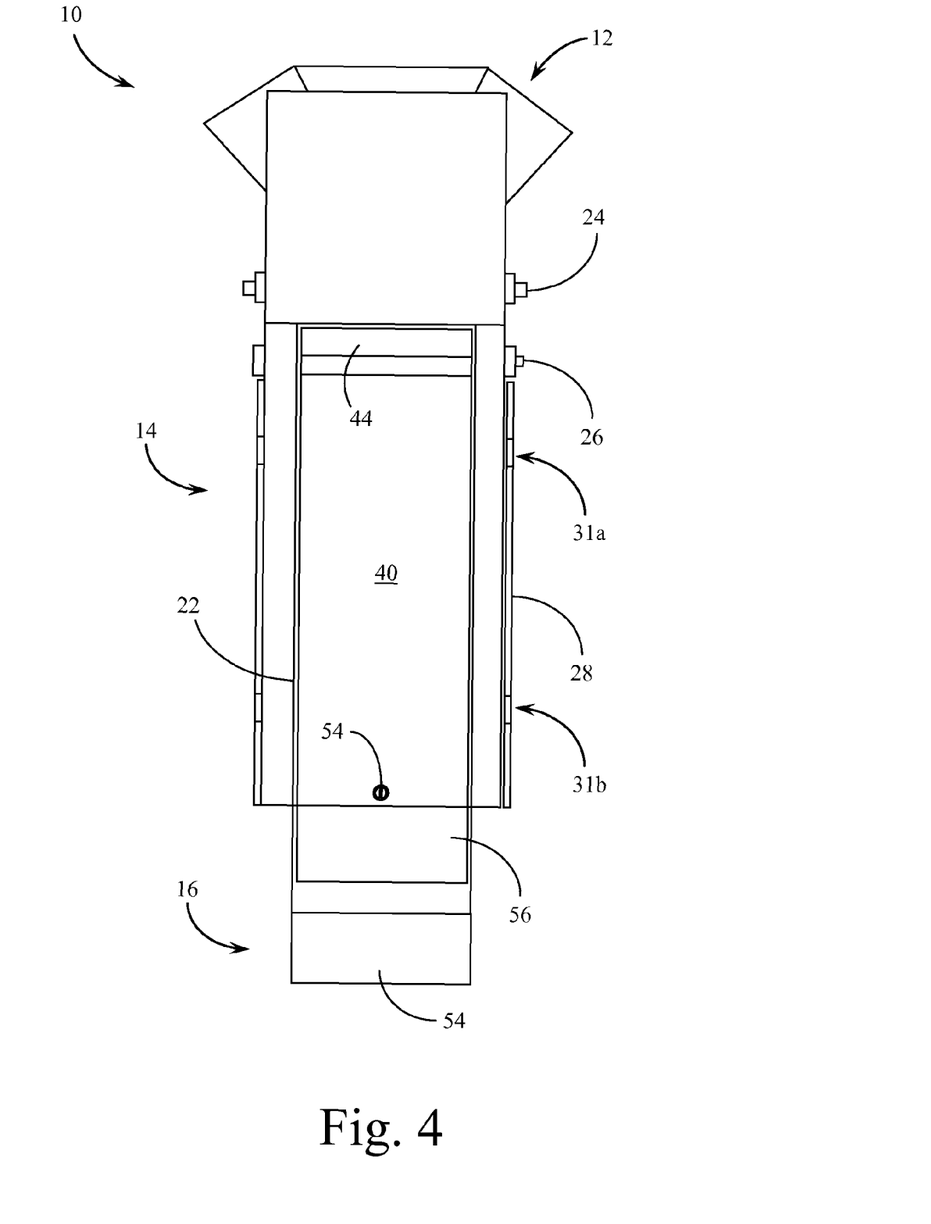
FIG. 4 is a rear elevational view (from the side to be attached to the belt sander) of the preferred embodiment of the present invention disclosing the internal components of the main housing of the device.

FIG. 4 is a rear elevational view showing the components of nut sheller 10 as seen from the side to which the belt sander is attached. In this view, hopper 12 extends away from main housing 14 and is secured thereto by hopper attachment bolts 24. Exit chute 16 is secured to the lower end of main housing 14 where it receives the cracked, but not entirely unshelled, nuts.

Internal to main housing 14 is primarily angled plate 40 which is secured to angled plate support rod 26 at an upper edge and is positioned under the edge of hopper feed shelf 44. In this manner, the nuts fed into main housing 14 are unobstructed from falling into contact with angled plate 40. Mounting brackets 28 are seen edge on, including bracket hooks 31a & 31b.

Angled plate 40 is supported on angled plate support rod 26 and extends down through main housing 14 to a point where it is supported on a back side (not seen in this view) by angled plate adjustment posts associated with choke point adjustment bolts 32. Angled plate 40 is retained against these adjustable support posts by means of retention spring 58. Below main housing 14 and exit chute 16 are primary strike plate 54 (seen from the outside in this view) and secondary strike point 56 (seen from the inside in this view).

Figure 5:
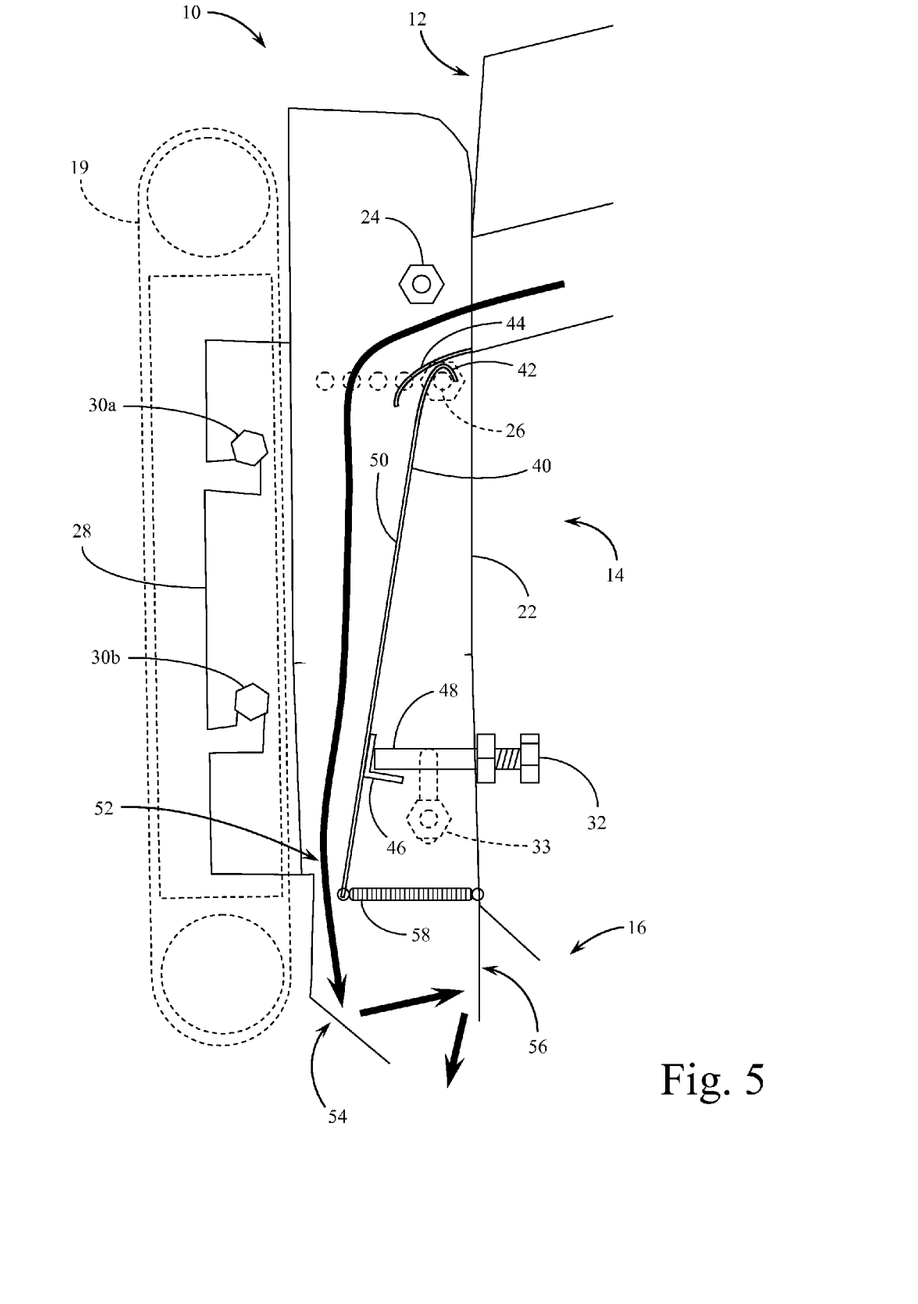
FIG. 5 is a partial cross-sectional view of the preferred embodiment of the present invention showing the internal components associated with the operation of the device.

FIG. 5 is a partial cut-away view that discloses the internal components of nut sheller 10 of the present invention and the manner in which these components combine and operate to first insure the cracking of the nut shell and then second the separation of the nut meat from the shell components. Nut sheller 10 is again shown to be made up of hopper 12, main housing 14, and exit chute 16. The manner in which nut sheller 10 is attached to and supported on the belt sander, and in particular moving belt 19, is shown as mounting bracket 28 positioned over bracket bolts 30a & 30b.

Hopper 12 is attached to main housing 14 by hopper attachment 24 and exit chute 16 is attached to main housing 14 by exit chute adjustment bolt 33. Hopper feed shelf 44 is shown extending into main housing 14 to provide the inlet for primary chute 22. Hopper feed shelf 44 fits over angled plate support rod 26 and angled plate top support 42. Angled plate top support 42 comprises the top edge of angled plate 40 formed in a U-channel and allowed to pivot on angled plate support rod 26 which extends through the width of main housing 14 as described above. Variations on the placement of angled plate 40 and angled plate top support 42 may be accomplished by placing angled plate support rod 26 in any of the other top angle adjustment holes 25 pre-drilled through the walls of main housing 14.

As the nuts fall from hopper 12 into primary chute 22, they are channeled by angled plate 40 onto slide surface 50 thereof to choke point 52 between angled plate 40 and moving belt 19. The movement downward at this point on moving belt 19 draws the nuts into choke point 52 squeezing them between angled plate 40 and the surface of moving belt 19. In the process, the shells of the nuts are generally cracked, although not necessarily removed from the meat of the nut. The separation of the shells and the meat is accomplished by the accelerated motion of the cracked nuts downward towards primary strike plate 54 where impacts with primary strike plate 54 and impacts with secondary strike plate 56 serve to generally separate the shell pieces from the meat of the nut.

The angle of angled plate 40 maybe adjusted not only by placement of angled plate support rod 26 into any of top angle adjustment holes 25, but more specifically by the movement and adjustment of angled plate adjustment posts 48 which extends from adjustment bolts 32. In the preferred embodiment, this angled plate adjustment post combination with adjustment bolts 32 comprise threaded bolts fitted with an additional nut to fix the bolt once properly adjusted. Angled plate adjustment posts 48 contact angled plate 40 at angled plate bottom support 46. In the preferred embodiment, angled plate bottom support 46 is an L-bracket fixed to the back side of angled plate 40 to provide a contact point with angled plate adjustment posts 48.

Tension spring 58 is connected between a lower edge of angled plate 40 and a rear wall of main housing 14 to preference angled plate 40 against angled plate adjustment post 48. In the preferred embodiment, the lower plate edge of angled plate 40 that provides one side of choke point 52 is not entirely rigid, and provides some flexibility in opposition to the generally inflexible surface of moving belt 19 against the rigid support surface of the belt sander over which the belt moves. In this manner, the system of the invention is unlikely to jam, even if the nut passing through choke point 52 is too hard to crack. In other words, some minimum flexibility to the lower edge of angle place 40 provides just the right resilient force to crack most nuts and still allow them to pass through to the exit chute without jamming the system. When the nuts move through choke point 52, not only are their shells cracked, but the nuts are accelerated downward with great force to strike against primary strike plate 54. With this greater force, the shell pieces begin to separate from the meat. Subsequent movement of the pieces of the nut shell and nut meat against secondary strike plate 56 serves to complete the separation process so that both nut shells and meat from the nut fall through exit chute 16 in a consolidated stream into the collection bag.

There are known methods for dividing the loose pieces of nut shell from the loose pieces of meat. Most commonly shell pieces may be physically separated from the nut pieces by a flow of air that carries the nut pieces away from the nut meat originally in a mixed stream. In this manner, a quantity of unshelled nuts may be placed into the hopper and allowed by gravity to feed into the device of the present invention where they are automatically shelled and separated to be dispensed into a collection bag attached to the opening of the exit chute.

Figure 6A:
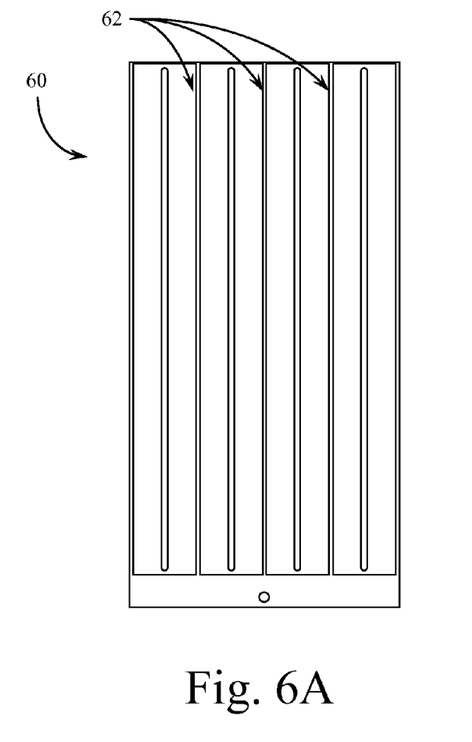
FIGS. 6A-6C are plan views of an alternate embodiment of the angled plate of the present invention.
Figure 6B:
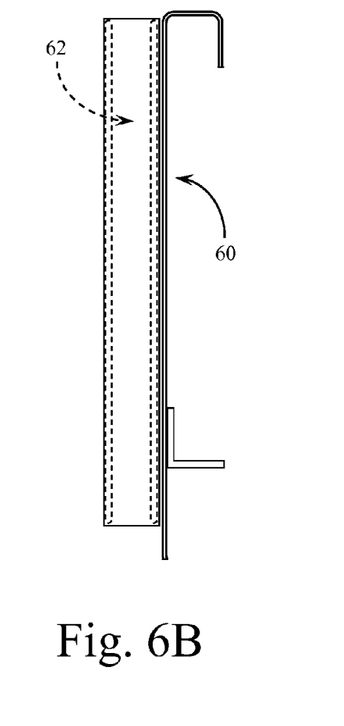
Figure 6C:
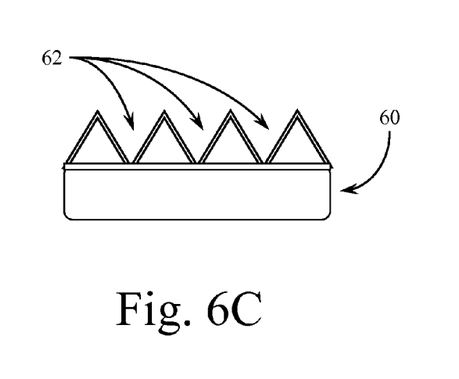

FIGS. 6A-6C are plan views of an alternate embodiment of the angled plate of the present invention. For those nuts which require application of force on the shell in a particular direction, the nut may have to be specially oriented with respect to the moving belt. For example, in the cracking of the shells of almonds, the angled plate 60 may include channels 62 which cause the almonds to be positioned so that the edge of each almond is in contact with the moving belt.

Although the present invention has been described in conjunction with a preferred embodiment, those skilled in the art will recognize modifications to the embodiment that still fall within the spirit and scope of the invention. Variations as to size and overall geometry of the device that incorporate the same basic components are anticipated. Variations in the manner in which the device is attached to different types of belt sanders, both portable and bench mounted, are also anticipated. The adjustable components as described above are intended to allow for slight modifications to the geometry of the device to accommodate variations in different types of nuts to be shelled and in different quantities to be fed into the device during a given operation of the device. Variations on the structure of the angled plate (as suggested by the alternate embodiment described) are further anticipated. Once again, all such variations do not necessarily fall outside the spirit and scope of the invention as claimed.

We claim:

1. A nut shell removal system comprising;
    a power driven moving belt;
    an angled plate positioned in close proximity to said power driven moving belt, the moving belt and the angled plate forming a primary chute, the primary chute generally open on a first upper end and generally constricted on a second lower end;
    a housing for holding said angled plate in position with respect to said power driven moving belt;
    a primary strike plate positioned at a spaced distance from the second lower end of the primary chute, the primary strike plate forming a first angled wall of a separation chamber;
    a secondary strike plate positioned at a spaced distance from the primary strike plate, the secondary strike plate forming a second angled wall of the separation chamber, the second angled wall opposing the first angled wall;
    wherein a nut is allowed to fall into a space of decreasing size between said angled plate and said power driven moving belt so that the shell of the nut is caused to crack and the cracked nut is imparted with a directed velocity against the primary and secondary strike plates, thereby separating the shell of the nut from the edible portion of the nut.

2. The system of claim 1 further comprising an angle adjustment mechanism adjustably fixed on said housing and positioned to at least contact the angled plate proximate to the second lower end of the primary chute, wherein adjustment of the adjustment mechanism varies the constriction on the second lower end of the primary chute.

3. The system of claim 2 wherein the angle adjustment mechanism comprises:
    a threaded post extending through the housing to a contact point on a back side of the angled plate, the back side of the angled plate comprising a side of the plate facing away from the power driven moving belt; and a retention spring positioned between the housing and the angled plate proximate to the second lower end of the primary chute;

wherein the retention spring holds the angled plate against the threaded post at said contact point.

4. The system of claim 3 wherein the angle adjustment mechanism further comprises a support rod variably positioned through one of a plurality of aperture pairs structured in the housing proximate to the first upper end of the primary chute, the support rod pivotally supporting said angled plate.

5. The system of claim 1 further comprising a hopper having a input end and an output end, the output end of the hopper positioned adjacent the first upper end of the primary chute formed by the power driven moving belt and the angled plate.

6. The system of claim 5 wherein the hopper further comprises a hopper feed shelf extending from the output end of the hopper over the angled plate into the generally open first upper end of the primary chute, and further wherein the angle of the hopper with respect to the primary chute may be varied.

7. The system of claim 1 further comprising an exit chute having an input end and an output end, the input end of the exit chute positioned adjacent the secondary strike plate and forming an output to the separation chamber.

8. The system of claim 1 wherein the angled plate further comprises a plurality of parallel nut alignment channels, the plurality of alignment channels extending along a length of the angled plate in a direction generally extending from the first upper end of the primary chute to the second lower end of the primary chute, wherein the plurality of alignment channels serve to orient nuts having a long dimension and a short dimension such that the short dimension of the nut encounters the constricted lower second end of the primary chute.

9. A nut shell removal system attachable to a bench mounted belt sander having a moving belt, the nut shell removal system comprising;

an angled plate positioned in close proximity to the moving belt of the belt sander, the moving belt and the angled plate forming a primary chute, the primary chute generally open on a first upper end and generally constricted on a second lower end;

a housing for holding said angled plate in position with respect to the moving belt of the belt sander;

a primary strike plate positioned at a spaced distance from the second lower end of the primary chute, the primary strike plate forming a first angled wall of a separation chamber;

a secondary strike plate positioned at a spaced distance from the primary strike plate, the secondary strike plate forming a second angled wall of the separation chamber, the second angled wall opposing the first angled wall;

wherein a nut is allowed to fall into a space of decreasing size between said angled plate and the moving belt of the belt sander so that the shell of the nut is caused to crack and the cracked nut is imparted with a directed velocity against the primary and secondary strike plates, thereby separating the shell of the nut from the edible portion of the nut.

10. The system of claim 9 wherein said housing comprises at least one mounting bracket, the at least one mounting bracket removably attachable to the belt sander at at least one point adjacent to the moving belt of the belt sander.

11. The system of claim 10 wherein the belt sander has a plurality of bracket bolts positioned to either side of the sides of the moving belt in spaced separation therefrom, and wherein the at least one mounting bracket comprises at least two mounting brackets oriented to engage the plurality of bracket bolts.

12. The system of claim 9 further comprising an angle adjustment mechanism adjustably fixed on said housing and positioned to at least contact the angled plate proximate to the second lower end of the primary chute, wherein adjustment of the adjustment mechanism varies the constriction on the second lower end of the primary chute.

13. The system of claim 12 wherein the angle adjustment mechanism comprises.

a threaded post extending through the housing to a contact point on a back side of the angled plate, the back side of the angled plate comprising a side of the plate facing away from the moving belt of the belt sander; and a retention spring positioned between the housing and the angled plate proximate to the second lower end of the primary chute;

wherein the retention spring holds the angled plate against the threaded post at said contact point.

14. The system of claim 13 wherein the angle adjustment mechanism further comprises a support rod variably positioned through one of a plurality of aperture pairs structured in the housing proximate to the first upper end of the primary chute, the support rod pivotally supporting said angled plate.

15. The system of claim 9 further comprising a hopper having a input end and an output end, the output end of the hopper positioned adjacent the first upper end of the primary chute formed by the moving belt of the belt sander and the angled plate.

16. The system of claim 15 wherein the hopper further comprises a hopper feed shelf extending from the output end of the hopper over the angled plate into the generally open first upper end of the primary chute, and further wherein the angle of the hopper with respect to the primary chute may be varied.

17. The system of claim 9 further comprising an exit chute having an input end and an output end, the input end of the exit chute positioned adjacent the secondary strike plate and forming an output to the separation chamber.

18. The system of claim 9 wherein the angled plate further comprises a plurality of parallel nut alignment channels, the plurality of alignment channels extending along a length of the angled plate in a direction generally extending from the first upper end of the primary chute to the second lower end of the primary chute, wherein the plurality of alignment channels serve to orient nuts having a long dimension and a short dimension such that the short dimension of the nut encounters the constricted lower second end of the primary chute.

* * * * *